Feb. 9, 1932.  F. H. OWENS  1,844,676
MOTION PICTURE WINDING APPARATUS
Filed Dec. 4, 1928  2 Sheets-Sheet 1
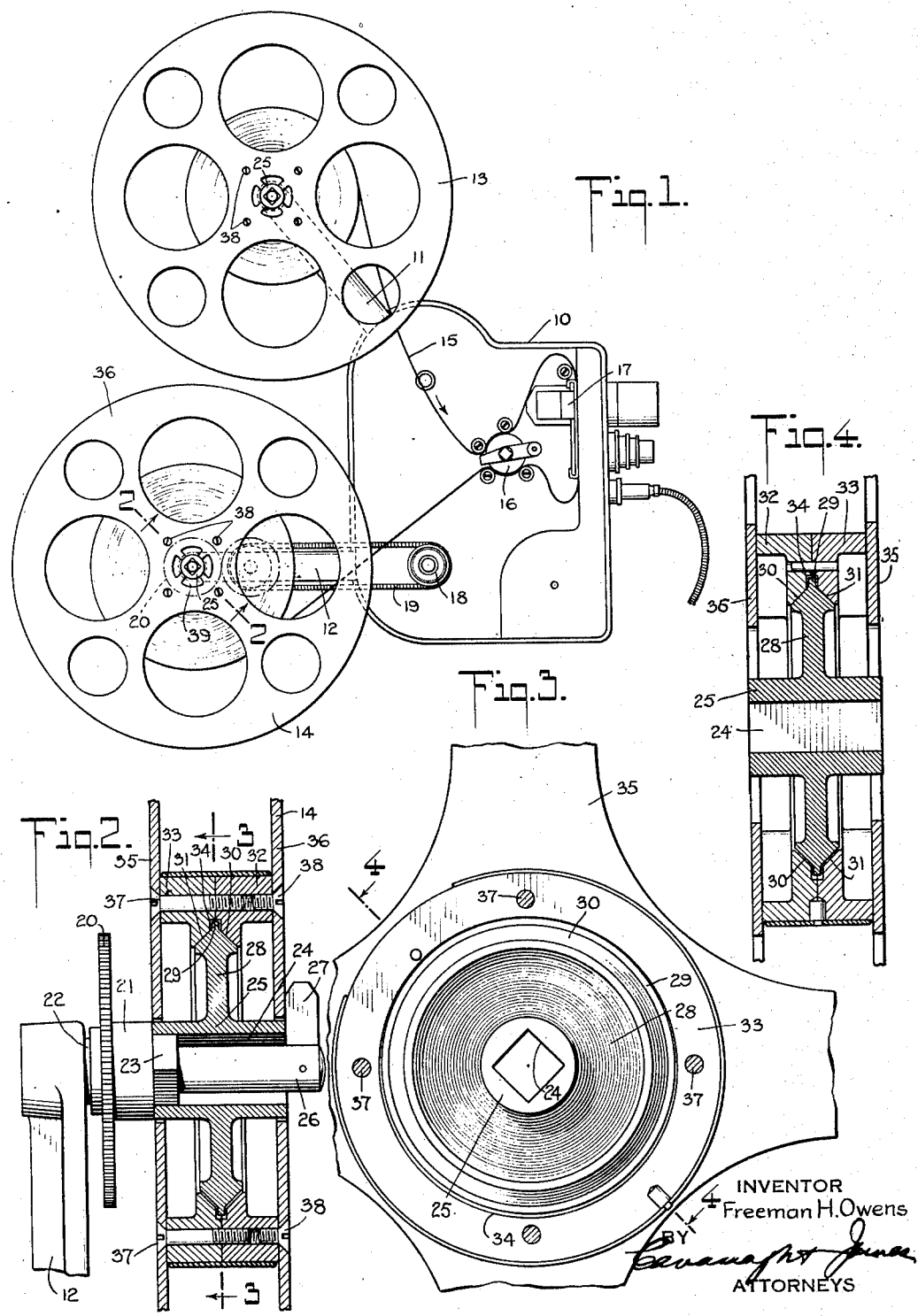
INVENTOR
Freeman H. Owens
BY
ATTORNEYS Feb. 9, 1932.  F. H. OWENS  1,844,676
MOTION PICTURE WINDING APPARATUS
Filed Dec. 4, 1928  2 Sheets-Sheet 2

INVENTOR
Freeman H. Owens
BY
ATTORNEYS

Patented Feb. 9, 1932

1,844,676

UNITED STATES PATENT OFFICE

FREEMAN H. OWENS, OF NEW YORK, N. Y.

MOTION PICTURE WINDING APPARATUS

Application filed December 4, 1928. Serial No. 323,635.

The present invention relates to a motion picture projecting apparatus embodying a film feeding device and a pair of reels, one of which is a film feed reel and the other being a take up reel. The present invention also relates to a film re-winding apparatus.

In reels used heretofore various difficulties have been experienced for the reason that as the take up reel, associated with a motion picture projector, or with a re-winding apparatus, is operated and the amount of film wound thereon increases the torque necessary for maintaining the film in a tightly wound condition increases. This fact has made it difficult to wind the film on the take up reel in the projector or in a re-winding apparatus tightly and with substantially the same tension throughout.

It is the object of the present invention to overcome the above difficulties by providing a reel which will be automatically responsive to the amount of film wound thereon and will automatically increase the torque and so maintain the tension on the film despite the increase of film wound thereon.

Another object of the present invention is to provide an apparatus of the type described in which the take up reel whether it be used in connection with a projector apparatus or whether it be used in connection with a re-winding apparatus, will at all times maintain a substantially constant tension on the film with the result that the film will be wound tightly and will facilitate the subsequent re-winding of the film or the subsequent use of the reel as a feed reel in projection.

To accomplish the above ends the reel embodies a clutch which operates in such a manner as to transmit the driving torque to the reel in approximate proportion to the amount of film that is already wound on the reel.

Other features of the invention will become apparent from the detailed description given below when taken in connection with the accompanying drawings which form a part of this specification and which illustrate one embodiment of the present invention.

Fig. 1 shows a motion picture projector embodying the present invention.

Fig. 2 is a sectional view on the line 2—2 of Fig. 1.

Fig. 3 is a view taken on the line 3—3 of Fig. 2.

Fig. 4 is a sectional view taken on the line 4—4 of Fig. 3.

Figure 5:
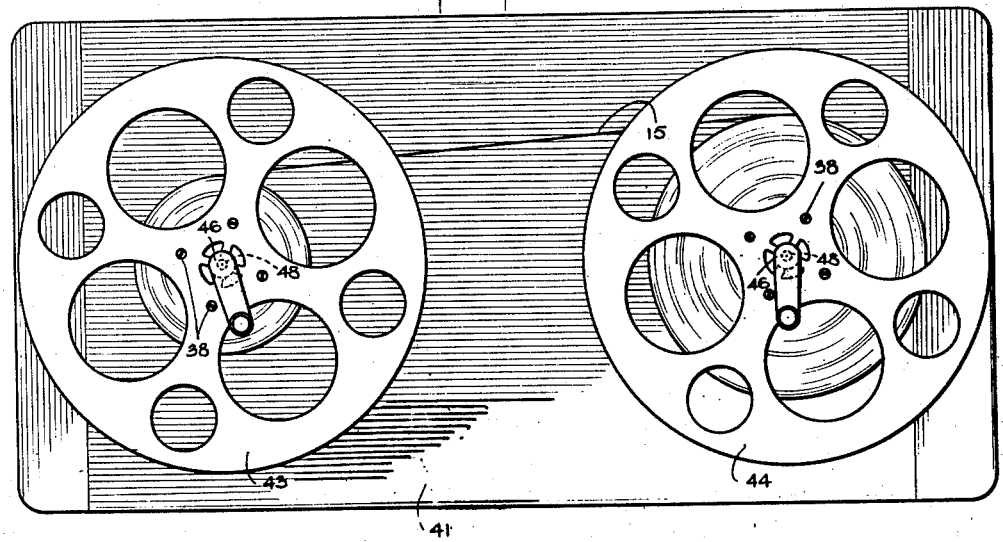
Fig. 5 shows a re-winding apparatus embodying the present invention.
Figure 6:
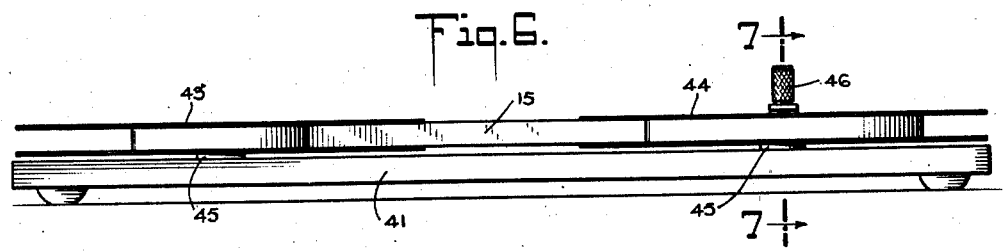
Fig. 6 is an end view of the same apparatus.
Figure 7:
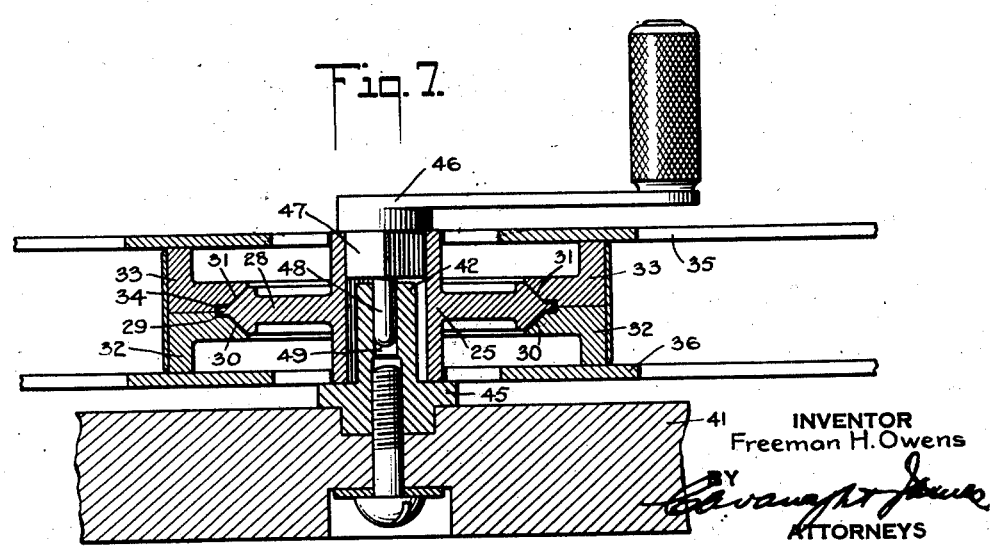
Fig. 7 is a sectional view taken on line 7—7 of Fig. 6.

Referring to Fig. 1 of the drawings, 10 is a conventional showing of the motion picture projector carrying arms 11 and 12 for supporting the feed reel 13 and take up reel 14, respectively.

The film 15 is fed in the direction of the arrow by means of the feeding device 16 past the projecting apparatus 17 and towards the take up reel 14. A motor (not shown) rotates the pulley 18, this power being transmitted to the take up reel 14 by means of the belt or sprocket chain 19 and pulley or sprocket wheel 20.

The wheel 20 is fixedly mounted on and carried by the stud shaft 21, which is rotatable on the boss 22, which is integral with the arm 12. The stud 21 is provided with a square shaft 23 which fits into the square opening 24 in the hub 25 of the take up reel 14. In order to hold the reel 14 on the shaft 23, the shaft also carries a rod 26, which projects through the passage 24 and carries on its free end a spring pressed pivoted stop member 27 for holding the reel in position.

Referring now to the specific embodiment in one phase of the invention and to the specific construction of the reel as shown in the drawings, the hub 25 is provided with an integral disc 28, the disc being also provided with a circumferential annular bead 29. The outer face of the disc 28 is bevelled on each side thereof, thus giving the inclined circumferential faces 30 and 31, one on each side of the circumferential bead 29.

The main body portion of the reel is composed of two cooperating parts 32 and 33. The adjoining faces of the parts 32 and 33 are channeled to give an interior circumferential channel 34 for housing the circumferential bead 29 on the hub 25. The parts 32 and 33 of the main body of the reel are also provided with bevelled faces engaging the bevelled faces 30 and 31 respectively of the hub. The interior diameter of the channel 34 is somewhat greater than the external diameter of the bead 29 so that when the reel is in operation the walls of the channel 34 are generally out of contact with the walls of the bead 29. The object of the bead 29 and channel 34 is to cooperate with each other in such a manner as to guide the main body of the reel on the hub, and to retain the same properly positioned but not to transmit any driving power to the reel. The power for driving the reel is transmitted through the contacting portions of the cooperating bevelled faces of the hub and the main body of the reel.

In order to permit for the variability of the power transmitted through these bevelled faces it is preferred that the internal diameter of the bevelled faces of the main body be somewhat greater than the external diameter of the bevelled faces of the hub. The reel is also provided with a pair of circular lateral guide plates 35 and 36. The plate 35 is held against the body portion 33 by a series of screws 37, which also serves to hold the two body portions together and the guide plate 36 is held in position by a series of screws 38.

As will be seen from an inspection of Fig. 1, the feed reel 13 and the take up reel 14 are mounted in such a manner that they rotate on horizontal axes. As the operation of the projector proceeds the amount and weight of film wound on the take up reel 14 increases and the weight supported by the reel increases. As a result thereof the pressure between the bevelled faces of the hub and main body of the reel increases, so that the power or torque transmitted by the hub to the body portion of the reel and to the film increases. It will be seen therefore that by the use of a reel construction embodying the present invention the film will be wound on the take up reel 14 tightly and the difficulties experienced by reels used heretofore are obviated.

While the construction of the reel is such that the power or torque transmitted to the main body of the film is varied with the amount of film upon the reel when the reel is used in a vertical position as a take up reel during projection, the same construction and the same structural elements of the reel serve the same function when it is used in a horizontal position in a re-winding apparatus.

Referring to Fig. 5, 41 is a horizontal board having a pair of posts 42 mounted thereon to receive a pair of reels 43 and 44 for the purpose of unwinding a film from one reel onto the other reel. The posts 42 are preferably of a diameter much smaller than the internal dimensions of the passage 24 in the hub of the reel. The posts 42 are provided with a shoulder portion 45 to serve as a support for the reel. A crank lever 46 is provided with a stud 47 which is adapted to be inserted into the passage 24 of the hub of the reel, the stud also carrying a pin 48 which is adapted to be inserted into the axial opening 49 in the post 42.

The reels shown in the re-winding apparatus are the same reels as those shown in the projection apparatus. It will be seen therefore that in re-winding the power is applied to the hub 25 by means of the manually operable crank lever 46 and the power or torque is transmitted to the main body of the reel by means of the upper bevelled face of the hub and its engagement with the upper bevelled face of the main body of the reel, the lower bevelled faces being frictionally out of engagement with each other.

In the operation of the re-winding apparatus, therefore, the power or torque transmitted by the hub to the main body of the reel will also vary with the amount and weight of film that is wound on the reel and as the amount and weight of the film wound on the reel increases the pressure between the engaging bevelled faces will increase and the power or torque transmitted will increase, so that a uniformly tightly wound reel of film is obtained.

Having described my invention in detail and in respect to one embodiment thereof, I do not desire to be limited to such details or form, since many changes and modifications may be made and the invention may be embodied in other forms without departing from its spirit and scope.

I claim:

1. A motion picture film reel comprising a hub adapted to be connected to rotary driving means, and a body portion encircling said hub, one of said elements having an annular channel, and the other of said elements having a circumferential bead disposed within said channel, said hub and body portion having additional engaging friction faces for the transmission of power to said body portion.

2. A film reel comprising a rotatable hub having a pair of bevelled peripheral faces, a body portion having a cylindrical exterior face to receive a motion picture film, said body having an annular groove on its interior face frictionally engaging the bevelled faces of said hub, and a pair of parallel side plates carried by said body portion extending to the hub and enclosing said frictionally engaging members.

3. A motion picture film reel comprising a rotatable hub having bevelled faces and an annular guide bead centrally of said faces, a body portion having a cylindrical peripheral face to receive a motion picture film, said body portion having an annular groove on its interior face receiving said bead, and also having annular inwardly bevelled friction faces engaging said bevelled hub faces, and a pair of parallel side plates carried by said body portion.

4. A motion picture film reel comprising a hub adapted to be connected to rotary driving means, the said hub having oppositely directed beveled faces, and a body portion encircling said hub, said body portion comprising two sections detachably connected together, each section being provided with a beveled face for friction driving cooperation with a beveled face of said hub.

5. A motion picture film reel comprising a hub adapted to be connected to rotary driving means, the said hub having oppositely directed beveled faces arranged on opposite sides of a median plane, and a body portion encircling said hub, said body portion comprising two sections detachably connected together and arranged on opposite sides of said median plane, each section being provided with a beveled face for friction driving cooperation with a beveled face of said hub.

6. A motion picture film reel comprising a rotatable hub having bevelled faces and an annular guide bead, a body portion having a cylindrical peripheral face for receiving a motion picture film, said body portion having an annular groove on its interior face for receiving said bead and having additional bevelled faces for frictionally engaging the bevelled faces of the hub, and a pair of side plates carried by said body portion and extending inwardly to the hub for enclosing said frictionally engaging members.

Signed at New York, in the county of New York and State of New York, this 3rd day of December, A. D. 1928.

FREEMAN H. OWENS.